United States Patent [19]

Dimauro

[11] 3,964,638

[45] June 22, 1976

[54] DISPENSER FOR BODIES IN SEALED SHEET MATERIAL COMPARTMENTS

[76] Inventor: Frank S. Dimauro, 4829 Atlantic Ave., Ventnor, N.J. 08406

[22] Filed: Dec. 19, 1974

[21] Appl. No.: 534,657

[52] U.S. Cl. .................................... 221/3; 83/423; 221/15; 221/25; 221/30; 226/127

[51] Int. Cl.[2] .................... G07F 11/68; B65G 29/00

[58] Field of Search ............... 221/3, 15, 25, 30, 72, 221/73; 83/278, 423; 226/127, 128

[56] References Cited

UNITED STATES PATENTS

| | | | |
|---|---|---|---|
| 1,793,165 | 2/1931 | Eckmann | 221/25 |
| 1,845,879 | 2/1932 | Knee | 221/25 |
| 3,651,984 | 3/1972 | Redenbach | 221/3 |

*Primary Examiner*—Stanley H. Tollberg
*Assistant Examiner*—David A. Scherbel
*Attorney, Agent, or Firm*—Steinberg and Blake

[57] ABSTRACT

A device for dispensing, one by one, a series of bodies arranged in a row within sealed compartments of an elongated sheet material which must be severed between its compartments for individually releasing the bodies in their sealed compartments. A container is provided for housing a strip of the sheet material and the bodies carried thereby in the sealed compartments thereof. This container has a wall formed with a discharge opening. A manually operable structure is carried by the container opposite to the latter wall thereof for reciprocating movement by the operator from a rest position first in a forward direction away from the rest position and then in a rearward direction back to the rest position. This manually operable structure is connected to at least part of a structure for feeding the strip of sheet material in a direction which will advance a body in a compartment of the sheet material out through the discharge opening and for cutting across the sheet material between the compartment carrying the latter body and the next compartment, so that the severed part of the sheet material with a body situated in a compartment thereof will drop from the container.

15 Claims, 8 Drawing Figures

DISPENSER FOR BODIES IN SEALED SHEET MATERIAL COMPARTMENTS

BACKGROUND OF THE INVENTION

The present invention relates to dispensers.

In particular, the present invention relates to that type of dispenser which is designed to dispense articles such as bodies which are sealed within compartments of a strip of sheet material.

Although many different types of dispensers for the above purpose are known, the conventional dispensers suffer from a number of drawbacks. In the first place their construction is exceedingly complex so that the conventional dispensers are expensive to manufacture and are inconvenient to operate. In the second place, even though such conventional dispensers are capable of making a body sealed in a compartment of sheet material available to the operator, nevertheless the operator must with conventional dispensers of the above type manually tear a body in its sealed compartment from the strip of sheet material, and this latter requirement is a particular inconvenience. Furthermore, conventional dispensers of the above type are difficult to reload when the contents thereof have been exhausted.

Furthermore, it is often desirable to give to the operator an indication of when a body should be removed from the dispenser. For example when the bodies are in the form of medication, it will generally be required that the bodies be taken from the dispenser at predetermined intervals. For this purpose, it has already been proposed to provide conventional dispensers with indicia printed or otherwise mounted thereon for indicating various time intervals. However, if the operator forgets to look at the dispenser to check when the next body should be removed from the dispenser, the taking of the medication at the required intervals can be overlooked in an exceedingly undesirable manner which often is of critical importance to the operator since these matters deal with the health of the individual.

SUMMARY OF THE INVENTION

It is accordingly a primary object of the present invention to provide a dispenser which will avoid the above drawback.

Thus, it is an object of the present invention to provide a dispenser of the above general type which is characterized by an exceedingly simple and inexpensive construction.

Furthermore, it is an object of the present invention to provide a construction of the above type which is very convenient to operate.

Thus, it is an object of the invention to provide a dispenser of the above type which can automatically separate from the interior of the dispenser individual bodies in their sealed compartments so that the operator is not required to tear a body in its sealed compartment manually from the remainder of a strip of sheet material which carries additional bodies.

Also, it is an object of the present invention to provide a construction of the above type which is exceedingly simple to reload when the contents thereof have become exhausted.

In addition it is an object of the present invention to provide a structure of the above type which is of a relatively small size so that it can conveniently be carried about in a pocket of a garment, in a handbag, or the like.

Furthermore, it is an object of the present invention to provide a dispenser of the above type which is capable of indicating to the operator when the next body should be taken from the dispenser, without any possibility of failure of the operator to be notified of the requirement of taking a body from the dispenser at a given time as long as the dispenser is close enough to the operator to enable the operator to respond to an audible signal.

According to the invention the device for dispensing, one by one, a series of bodies arranged in a row within sealed compartments of an elongated sheet material which must be severed between its compartments for individually releasing the bodies in their sealed compartments includes a container means for housing a strip of sheet material and the bodies carried thereby in sealed compartments thereof. This container means has a wall formed with a discharge opening. A manually operable means is carried by the container means opposite the latter wall thereof for reciprocating movement by the operator from a rest position first in a forward direction away from the rest position and then in a rearward direction back to the rest position. A means is connected at least in part to the manually operable means for responding to the forward movement thereof for feeding the strip of sheet material in a direction which will advance a body in a compartment of the sheet material out through the discharge opening and for cutting across the sheet material between the compartment thereof housing the latter body and the compartment thereof housing the next body, so that the body which is fed through the discharge opening will be severed to drop from the container means. The manually operable means cooperates with at least the part of the feeding and cutting means which is connected thereto for retracting the latter part with the manually operable means when the latter is returned to its rest position and for placing at least this latter part of the feeding and cutting means in readiness for feeding the next body to the discharge opening when the manually operable means is again moved forwardly from its rest position.

BRIEF DESCRIPTION OF THE DRAWINGS

The invention is illustrated by way of example in the accompanying drawings which form part of this application and in which.

DESCRIPTION OF PREFERRED EMBODIMENTS

Figures 1, 2, 3, 4, 5:
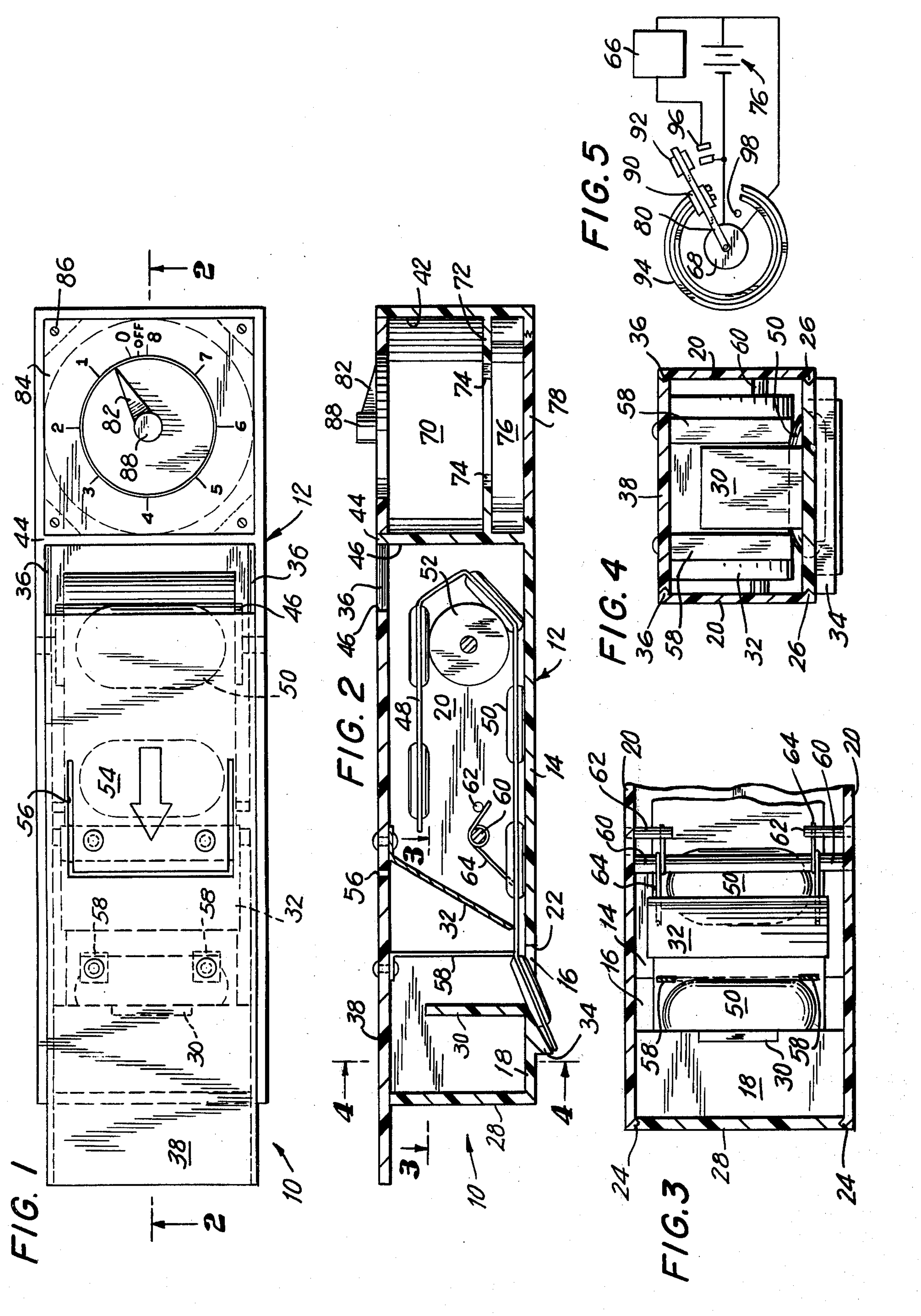
FIG. 1 is a top plan view of one possible embodiment of a dispenser according to the invention, the dispenser being shown in FIG. 1 with the manually operable means thereof displaced partly from its rest position.
FIG. 2 is a longitudinal sectional elevation of the structure of FIG. 1 taken along line 2—2 of FIG. 1 in the direction of the arrows.
FIG. 3 is a fragmentary sectional plan view taken along line 3—3 of FIG. 2 in the direction of the arrows.
FIG. 4 is a transverse sectional elevation of the dispenser taken along line 4—4 of FIG. 2 in the direction of the arrows.
FIG. 5 is a schematic wiring diagram showing how the timing and signal means, included in the dispenser of the invention, operate electrically.

Referring to the drawings and to FIGS. 1 and 2, in particular, there is illustrated therein one possible embodiment of a dispenser 10 in accordance with the present invention. The dispenser 10 includes a container means 12 which has a bottom wall 14 formed with a discharge opening 16. In the illustrated example the bottom wall 14 is made of a pair of sections and includes the forward section 18 which is situated forwardly of and spaced from the remainder of the bottom wall 14 so as to define with the remainder of the bottom wall 14 the discharge opening 16.

This bottom wall 14 of the container means 12 is integrally formed with a pair of opposed side walls 20, parts of which are shown in section in FIG. 3. Thus, the part of the bottom wall 14 which is integral with the side walls 20 terminates in a front edge 22. Beyond this front edge the opposed side walls 20 are of a springy nature. The material used for the container means may be made of any suitable plastic which will have this resiliency. At their front ends the side walls 20 are formed with a pair of vertically extending V-ribs 24 which are apparent in FIG. 3. Moreover, forwardly of the end 22 of the portion of bottom wall 14 which is integral with side walls 20 these side walls 20 have horizontal V-ribs 26 which extend forwardly from the opening 16. The front bottom wall portion 18 is integral with an upstanding front end wall 28, and this front end wall 28 as well as the front portion 18 of the bottom wall are formed at their side edges with V-grooves which receive the ribs 24 and 26, as is apparent from FIGS. 3 and 4. Therefore, the portion 18 and end wall 28 can be snapped between the front end regions of the walls 20 to assume the position shown in FIG. 2, and this front end structure 18, 28 will be releasably held in the illustrated postion due to the springy nature of the walls 20, although, if desired, the parts can be permanently connected as by gluing or the like.

For a purpose which is referred to below, the rear edge of front wall portion 18, which defines the front edge of the discharge opening 16, is formed integrally with an upstanding internal wall 30 forming a stop member for a cutting blade 32 which is shown in FIG. 2 and which is described in greater detail below. In addition, the bottom wall portion 18 is formed at its rear edge, which defines the front edge of the discharge opening 16, with a downwardly extending portion 34 having a lower surface which is inclined as shown in FIG. 2, so that this portion 34 will serve to deflect an article out of the opening 16 in a manner described in greater detail below.

The front end wall 28 of the container means 12 extends almost up to but terminates short of the upper edges of the side walls 20. These side walls 20 are provided along their upper edges with a guide means in the form of a pair of V-ribs 36 which are directed inwardly and face each other, as shown most clearly in FIG. 4. These V-ribs 36 are received in a pair of mating V-grooves formed in opposed side edges of a top wall 38 of the container means 12. This top wall 38 forms a manually operable means which is capable of being moved forwardly (to the left as viewed in FIGS. 1 and 2) from a rear rest position, and then the operator may move the wall 38 rearwardly back to its rest position, this wall 38 thus forming a manually operable means which is freely accessible to the operator for a purpose referred to below. Thus the V-ribs 36 act as a guide means to guide the manually operable means 38 for forward and rearward movement.

The interior of the container means 12 is divided into a front chamber 40 and a rear chamber 42 by a transverse partition 44, and this transverse partition 44 engages the rear edge 46 of the manually operable means formed by the wall 38 in order to determine the rear end or rest position of the manually operable means 38. Thus the manually operable means 38 is shown in FIGS. 1 and 2 displaced to some extent forwardly from its rear rest position for the sake of more clearly illustrating the structure of the invention. Because the top edge of the front end wall 28 does not extend above the guide ribs 36, the wall 38 is capable of moving freely back and forth over the top edge of the front end wall 28.

FIG. 2 illustrates within the interior of the chamber 40 of the container means 12 an elongated strip 48 of a sheet material such as a transparent plastic formed with sealed compartments which respectively house bodies such as pills, capsules, or the like, for medicinal purposes. Thus, FIG. 2 shows a series of sealed compartments 50 separated from each other by sealed transverse regions of the strip of sheet material 48, and each of these sealed compartments 50 contains a body which is to be dispensed in its sealed compartment. It is possible to shift the wall 38 forwardly to an extent sufficient for the operator to introduce the strip 48 into the container chamber 40, although if the component 18, 28 is held only by the springy action of the walls 20 it is also possible to remove this front component and then shift the wall 38 forwardly to an even greater extent, as will be apparent from the description which follows, so that free access may be had to the interior of the compartment 40 for loading it with a strip 48 which may contain, for example, eight compartments 50 with bodies therein, arranged in a row. In order to accommodate a larger number of these bodies and a longer strip 48 carrying the same the interior chamber 40 is provided with a transverse pin or bar 52 fixedly carried by the side walls 20 and extending therebetween, so that in this way the strip 48 can be guided around the bar 52 in the manner illustrated in FIG. 2.

A series of the compartments 50 with the bodies therein will extend along the upper surface of the part of the bottom wall 14 which is situated to the rear of the discharge opening 16, and the bottom edge of the blade 32 will be capable of engaging this part of the strip 48. Thus the blade 32 is a simple metal cutting blade which is relatively flexible and which is fixed at its top end to the lower surface of the manually operable means 38 so that the blade 32 forms a cutting means which must reciprocate with the manually operable means 38. In addition, the bottom edge of the cutting means 32 acts as a feed means as will be apparent from the description which follows. The flexible cutting blade 32 has a bottom cutting edge which resiliently presses against the part of the strip 48 which rests on the top surface of the bottom wall 14, in the manner shown most clearly in FIG. 2. Therefore when the operator displaces the manually operable means 38 forwardly from its rest position the bottom edge of the blade 32 will displace the strip 48 forwardly at its part which rests on the bottom wall 14. In order to assure sufficient pressure between the blade 32 and the strip 48, the upper end of the blade 32 is carried by a portion 54 of the wall 38 which is integral with the remainder of the wall 38 only at the rear end of the portion 54. Otherwise the portion 54 is separated from the remainder of the wall 38 by the slot 56 which extends through the wall 38 and which has the substantially C-shaped configuration shown most clearly in FIG. 1. As a result, when the operator moves the manually operable means 38 forwardly he can at the same time press downwardly on the springy tongue 54 which is formed in this way from part of the wall 38, so that this downward pressure can act through the blade 32 to assure the required pressure between the bottom edge thereof and the strip 48.

In this way it is possible for the operator to shift the lower front end of the strip 48 forwardly until it engages the surface 34 to be deflected thereby out through the opening 16.

The strip 48 will have a tendency to be deflected upwardly by the downward pressure of the bottom edge of the blade 32, and in order to avoid such upward deflection the wall 38 also fixedly carries a pair of downwardly extending substantially rigid fingers 58 which are spaced from each other by a distance greater than the width of the stop member 30, as is shown most clearly in FIG. 4. Therefore during the forward movement of the manually operable means 38 from its rear rest position it will be possible for the fingers 58 to move past the stop member 30 to become situated forwardly beyond the latter between the stop member 30 and the front end wall 28. The bottom ends of the fingers 58 are sufficiently close to the plane occupied by the upper surface of the wall 14 to engage the strip 48, particularly at its side edge regions beyond the compartments 50, and thus prevent any undesired upward deflection of the strip 48 due to the downward pressure of the blade 32.

As the manually operable means 38 is displaced forwardly, with the lower left compartment 50 and the body therein issuing out through the discharge opening 16, as shown in FIG. 2, the lower left or front cutting edge of the blade 32 will engage the stop member 30 and will be deflected downwardly by the latter so that during the continued forward movement of the manually operable means 38 the stop member 30 will cooperate with the blade 32 for contributing to the manner in which the latter cuts through the sheet material for separating a body in its compartment 50 from the remainder of the strip 48, and this severed compartment with the body therein will simply fall downwardly from the dispenser, the operator of course placing his hand beneath the opening 16 so as to receive the falling body in its sealed compartment 50. In this extremely convenient manner it is possible for the operator with one hand to carry out all of the manipulations required for severing a body in its sealed container from the remainder of the strip 48 while the other hand is available to catch the falling body in its sealed container 50.

Once the first body in its sealed compartment 50 has been separated in the above manner from the strip 48, the operator will retract the manually operable means 38 by moving it rearwardly to its rear rest position, and at this time the blade 32 will simply ride back along the strip 48 without advancing it rearwardly. This will result from the flexible nature of the blade 32 which is in the form of a thin metal strip having a relatively sharp bottom edge for cutting through the sheet material. In order to assure that the strip 48 will not be moved rearwardly in an undesired manner, a pair of pins 60 and 62 are also carried by and extend between the side walls 20 in the interior of the chamber 40. A pair of wire springs 64 are coiled about the front rod 60 and have free ends engaging the rear rod 62 in the manner shown in FIG. 2. The front forward ends of the springs 64 press against the side edges of the strip 48 so that they will only permit the part of the strip 48 which rests on the bottom wall 14 to move forwardly toward the opening 16. Therefore when the cutting and feeding means formed by the blade 32 is retracted with the manually operable means 38 there is an assurance that the strip 48 will not be moved rearwardly and thus the bottom edge of the blade 32 will become located behind the next compartment 50 which remains in its front end position extending across the opening 16. Thus during the next forward stroke of the manually operable means 38, this next compartment 50 and the body therein will be deflected downwardly out of the chamber 40 by the projection 34, and the above operations will be repeated.

As was pointed out above, once one strip 48 becomes exhausted it is a simple matter to shift the wall 38 forwardly to its front end position in order to have sufficient access to the interior of the chamber 40 for introducing a new strip 48 downwardly between the partition 44 and the guide bar 52. The operator will feed the front end of the strip along the upper surface of the wall 14 toward the opening 16 so that it will slide beneath the front ends of the springs 64 and then beneath the blade eventually abutting against the stop member 30, whereupon the operator will retract the wall 38 to its rear end position and the above operations can be repeated. In this simple manner it is possible to reload the container means 12. However, as was pointed out above, it is also possible, if desired, to remove the front end wall 28 and the structure connected therewith so as to have even greater access to the interior of the compartment 40. Then the wall 38 is returned and the front component assembly 18, 28, 30 is simple snapped back into position in the manner described above.

As has been indicated above, in the case where the bodies sealed in the compartments 50 are in the form of medication such as pills, capsules, or the like, it will be highly desirable to prevent the operator from forgetting to take the medication at the required time intervals. For this purpose the rear chamber 42 of the container means 12 serves to house a signal means 66 (FIG. 5) as well as a timing means 68. Both the timing means 68 and the signal means 66 are situated within a cylindrical housing 70 located in the rear chamber 42 above a partition 72 which extends horizontally across the interior of the chamber 42 above the bottom wall 14, this partition 42 being formed with a central opening through which springy conductors 74 extend. These conductors 74 engage a battery 76 which may be introduced by unscrewing a cover plate 78. When the battery is introduced with the cover plate 78 returned so as to hold the battery 76 in position it will press against the contacts 74 for establishing an electrical connection for a purpose referred to below in connection with FIG. 5. The signal means 66 is in the form of a conventional buzzer device capable of providing an audible sound when it is electrically energized while the timing means 68 is in the form of a suitable electric motor or electric motor and step-down transmission which when energized from the battery 76 will rotate an arm 80 at a given rate of speed which will provide the required time intervals.

Thus, as may be seen particularly from FIG. 2, the shaft of the motor 68 carries above the face of the housing 70 a pointer 82 which extends over the arm 80 which is shown in FIG. 5. This pointer 82 is capable of cooperating with the indicia shown in FIG. 1. The unit 70 is retained in the compartment 42 by a cover 84 which is held in position by screws 86 extending through openings at the corners of the cover and received in suitable bodies which are fixed in the interior of the compartment 42. The cover 84 carries around the upper face of the housing 70 the indicia shown in FIG. 1, the illustrated numerals being aligned with the illustrated graduations and indicating various hours. The shaft of the motor 68 terminates at its top end in a manually engageable portion 88 which the operator can grasp so as to turn both the pointer 82 and the arm 80, and if the pointer 82 is turned to any one of the indicated numerals then the timer will run for the indicated number of hours before the operation terminates. For example if the next pill is to be taken within four hours the operator will turn the pointer 82 in a counterclockwise direction, as viewed in FIG. 1, until it is aligned with graduation 4, and then the timer will automatically return the pointer 82 to the zero graduation after an interval of four hours. At this time the signal means 66 will automatically operate to give a sound which will remind the operator that he must take the medication at this time, and the timer then can be turned off by continuing to turn the pointer 82 in a clockwise direction until it is aligned with the "off" graduation, or the pointer 82 can be again returned to the graduation 4, so that the next signal will be given after an interval of four hours to remind the operator to take the next pill.

The above timer and signal means can have any conventional construction. As is shown in FIG. 5, the arm 80 within the upper part of the housing 70 carries a pair of electrically conductive brushes or bridging members 90 and 92, the arm 80 itself being made of an electrically non-conductive material. The brush or bridging member 90 bridges across a pair of arcuate electrically conductive strips 94 which are arranged as shown in FIG. 5, while the bridging member 92 is adapted to bridge across a pair of electrically conductive members 96 arranged as illustrated in FIG. 5. FIG. 5 also shows a stop member 98 which operates to engage the arm 80 so as to stop the latter when the pointer 82 is aligned with the "off" graduation shown in FIG. 2. Thus whenever the operator turns the arm 80 in a counterclockwise direction, to position the pointer 82 with a selected graduation, the member 90 will bridge across the conductors 94 so as to cause the battery 76 to energize the motor 68 which will now operate to return the arm 80 toward its initial position in the timed manner referred to above. Just before the member 92 moves beyond the contact strips 94, when the pointer 82 is about to reach the graduation zero, the member 92 will bridge across the contacts 96 for energizing the buzzer 66, thus giving the operator the signal that the next pill must be taken. Now the operator can either continue to turn the arm 80 until it engages the stop 98 at which time the circuit will be opened or the operator can return the arm 80 for again energizing the motor to start the next interval.

Figure 6:
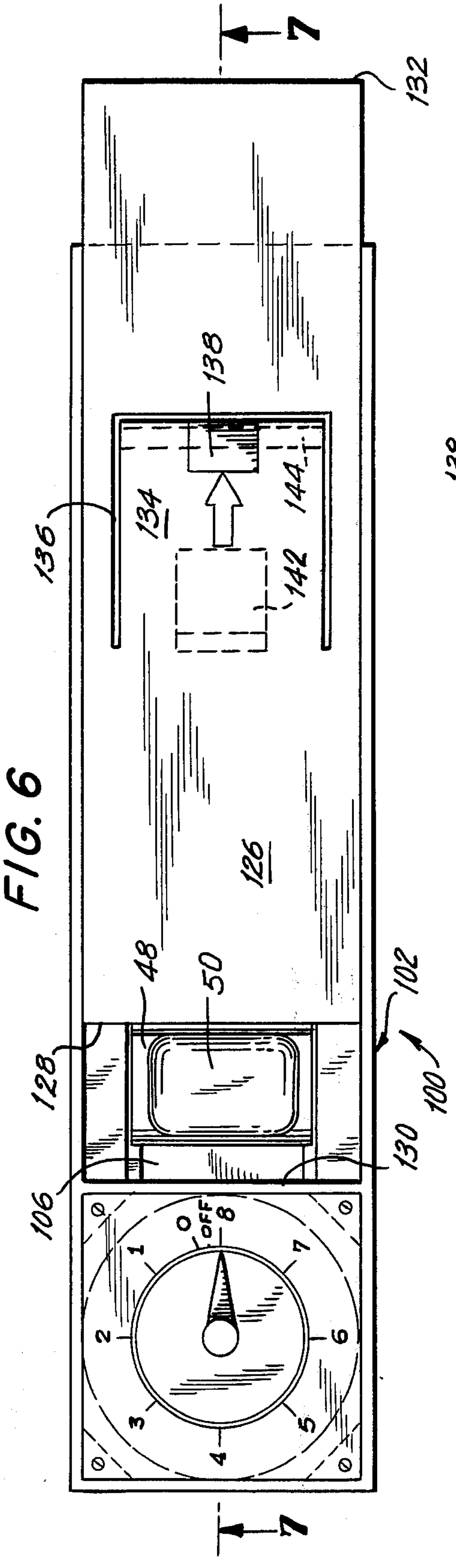
FIG. 6 is a top plan view of another embodiment of a dispenser according to the invention.
Figure 7:
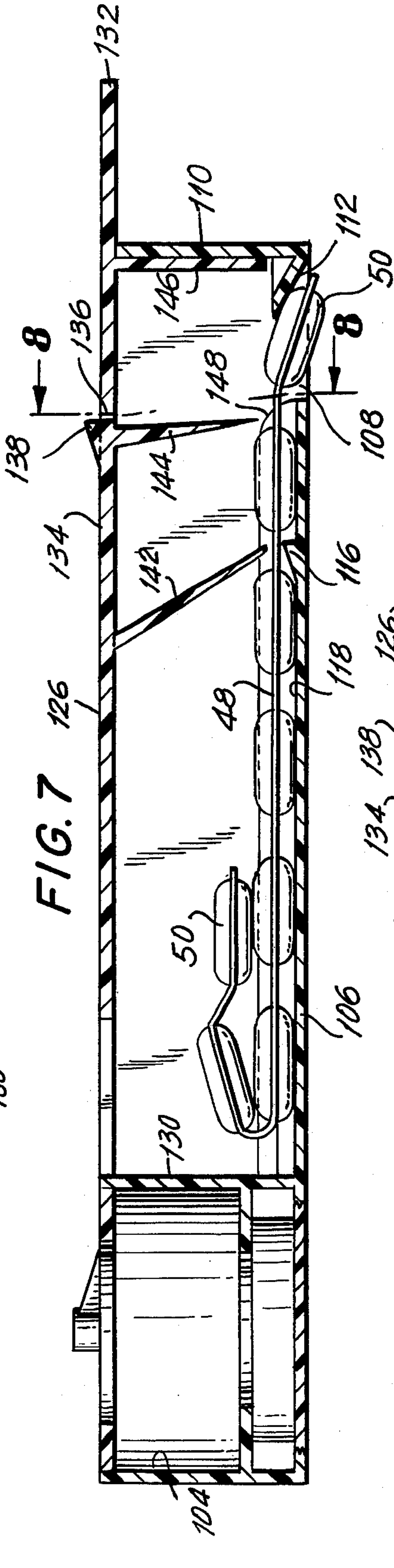
FIG. 7 is a longitudinal sectional elevation of the embodiment of FIG. 6 taken along line 7—7 of FIG. 6 in the direction of the arrows.
Figure 8:
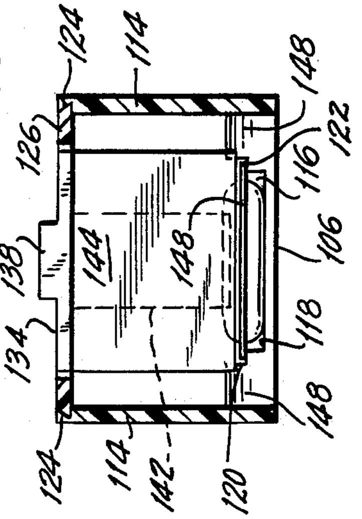
FIG. 8 is a transverse section of the structure shown in FIGS. 6 and 7, taken along line 8—8 of FIG. 7 in the direction of the arrows.

Referring now to FIGS. 6–8, in the embodiment of the invention which is illustrated therein, the dispenser 100 also includes a container means 102 which has at its rear end a chamber 104 corresponding to the chamber 42 and serving to house a signal means and timing means which may have the same construction as the signal means and timing means shown in FIG. 5 and described above.

The container means 102 has a bottom wall 106 formed at its front end with a discharge opening 108 through which the compartments 50 are adapted to be discharged when severed from the sheet material 48, as described above. Thus, the bottom wall 106 is joined at its front end to a front end wall 110 of the container means, and at the bottom edge of this front end wall the container means has the inclined surface 112 which will deflect the end compartment 50 downwardly in the manner shown in FIG. 7. Thus this part of the container means 102 which is provided with the surface 112 corresponds to the part 34 which is shown in FIG. 2. However, in the case of FIGS. 6–8, the container means 106 is molded from a suitable plastic so as to form a single unitary body, and thus the inclined wall which has the inclined surface 112 is molded directly to the front wall 110 which in turn is molded in one piece with the opposed side walls 14 which extend upwardly from the bottom wall 106. The container means 102 is completed by a stop projection 116 which extends across the bottom wall 106 at the inner surface thereof for a purpose referred to below. It will be noted that the transversely extending stop 116 has a front vertical edge and a top edge which is inclined downwardly toward the rear.

FIG. 8 illustrates the pair of side walls 114 as well as the bottom wall 106. As may be seen from FIG. 8 this bottom wall 106 is formed in its interior with a longitudinal groove 118 for accommodating the lower portions of the compartments 50, the groove 118 having above its lower portion a portion 120 which is wider than its lower portion and which defines therewith a pair of side edges 122 on which the lateral portions of the sheet material 48 can slide, these lateral portions extending laterally beyond the compartments 50, as is apparent from FIG. 8. The stop 116 extends completely across the lower portion 118 of the groove which is formed in the bottom wall 106 of the container means 102, and the top edge of the stop 116 is situated at the same elevation as the surfaces 122.

The upper inner regions of the side walls 114 are formed with grooves 124 of substantially V-shaped configuration, as is apparent from FIG. 8, and these grooves are adapted respectively to slideably receive opposed side edges of a shiftable top wall 126 which forms a manually operable means for the embodiment of FIGS. 6–8. As is apparent from FIG. 8 these side edges of the manually operable means 126 are also of a V-shaped cross section so as to mate with the grooves 124 and be freely slidable therealong.

The manually operable means 126 is shown in FIGS. 6–8 in its forward end position where it can be manipulated by the operator for severing from the sheet 48 the compartment 50 located at the discharge opening 108. The operator can retract the wall 126 back to a starting position where the rear edge 128 thereof engages the rear wall 130 of the container means 102, this rear wall 130 forming a front wall of the chamber 104. When the rear edge 128 of the wall 126 engages the rear wall 130, the front edge 132 of the wall 126 is located at the front end wall 110 of the container means 102. Thus the operator can manipulate the manually operable means 126 so as to space it forwardly to a cutting position and then retract it rearwardly back to its rest position.

In this embodiment also the wall 126 is provided with a manually deflectable portion 134 which is integral with the remainder of the wall 126 and which is separated therefrom along its opposed sides and front edge, the deflectable part 134 of the manually operable means 126 being separated from the remainder thereof by a substantially C-shaped slot 136 which corresponds to the slot 56 described above and shown in FIG. 1. In the embodiment of FIGS. 6–8, the deflectable part 134 of the manually operable means carries at the region of its front edge an upwardly directed projection 138 in front of the arrow 140 and available to the operator to facilitate manipulation of the manually operable means 126.

At its lower surface the deflectable portion 134 is formed integrally with a pusher 142 which forms a feed means, as will be apparent from the description which follows, while at the region of its front edge the deflectable portion 134 is formed integrally with a cutting blade 144. In addition, the shiftable wall 126 is integrally formed with a downwardly extending stop member 146. As is apparent from FIG. 7, this stop member 146 cooperates with the front end wall 110 in order to limit the forward movement of the manually operable means 126, so that the parts 110 and 146 form a stop means for determining the cutting position of the blade 144. This blade 144 together with the pusher 142 and the stop 146 are formed integrally with the wall 126, so that the manually operable means and all of the parts connected thereto also form a single unitary body. Thus the entire dispensing device of FIGS. 6–8 is composed only of a pair of unitary bodies each of which can be readily molded of a suitable plastic in a highly inexpensive manner.

As is apparent particularly from FIG. 7, the rear edge of the discharge opening 108 is situated at the bottom end of curved side surfaces 148 respectively situated at the opposite sides of the groove portions 118 and 120. Thus in FIG. 8, between the sectionally illustrated wall portions 114 there is the pair of curved surfaces 148 which form part of the cutting means, forming a stationary part thereof to cooperate with the movable cutting blade 144. As is apparent from FIG. 8, the movable cutting blade has a width somewhat greater than the width of the upper portion 120 of the groove formed in the bottom wall 116, so that this blade 144 will at its bottom edge cut completely across the sheet material 48.

The cutting blade 144 is made of a plastic material which is capable of flexing resiliently as the relatively sharp bottom cutting edge of the blade 144 moves along the curved stationary surfaces 148 of the cutting means.

In the same way, the pusher 142 is also in the form of a flexible resilient plastic sheet material. In fact the entire manually operable means with the components 142, 144, and 146 are made of such a resilient plastic material. In this way it becomes possible for the operator simply to snap the wall 126 up out of the grooves 124, and of course the wall 126 can be transversely curved to snap back into the grooves 124 whenever desired.

The above-described embodiment of FIGS. 6–8 operates in the following manner. Assuming that a strip of sheet material 48 with compartments 50 containing bodies therein has been situated in the container means 102, in the manner illustrated in FIG. 7, then whenever it is desired to dispense a compartment 150 with the body therein, the operator will displace the manually operable means 126 forwardly to the position shown in FIGS. 6 and 7, this position being determined by engagement of the stop projection 146 with the front end wall 110. Now the operator will simply deflect the portion 134 of the manually operable means by pushing this portion 134 downwardly toward the bottom wall 106. During the forward movement of the wall 126 from its rear rest position, the pusher 142 engages the second compartment 50 from the end compartment which is to be dispensed, and pushes the entire strip forwardly with this second from the end compartment 50 simply riding up over the stop 116 and then falling down in front of the latter, as is apparent from FIG. 7. Thus with the stop 146 engaging the wall 110 the operator will displace the deflectable portion 134 downwardly so that the cutting means 144, 148 will operate in the manner described above to sever the end compartment 50 from the remainder of the strip 48 with this severed compartment simply falling downwardly from the discharge opening 108. Now when the operator retracts the manually operable means 126 back to its starting position the flexible pusher 142 will simply ride over the second compartment 50 from the end, and the stop 116 will prevent the entire strip of compartments from being retracted. Thus in the rest position the pusher 142 will become situated between the second and third compartments 50 from the end compartment which will next be severed from the sheet material 48.

In order to introduce a new strip of sheet material 48 and compartments 50 attached thereto, such a strip can be introduced either through the gap provided between the rear edge 128 of wall 126 and the rear wall 130 of the compartment 102, or the entire manually operable means 126 may be removed and then replaced after a new strip has been introduced, in the manner described above. It will be noted from FIG. 7 that although the strip of sheet material 48 has the last two compartments 50 which are to be dispensed bent over the remainder of the strip, these last compartments will simply be flipped over to the proper positions by the rearward movement of the pusher 142 when a sufficient number of compartments have been dispensed to reach the last two compartments of the sheet material 48.

Thus, with the above relatively simple structure it is possible for an individual to take a series of pills, for example, being reliably reminded at the required intervals that the pills must be taken, and in addition it is extremely convenient for the operator to manipulate the dispenser of the invention for receiving the required bodies, in their sealed compartments, one by one. The length of the container means 12 between its opposed ends need not be greater than 6 inches, for example, while the depth and width of the container may be on the order of only 1 inch or slightly more if desired. In this way the entire dispenser 10 is exceedingly small and light in weight and can readily be carried about in the pocket of a garment or in a handbag without any inconvenience.

What is claimed is:

1. In a device for dispensing, one by one, a series of bodies arranged in a row within sealed compartments of an elongated sheet material which must be severed between said compartments for individually releasing the bodies in their sealed compartments, container means for housing a strip of the sheet material and the bodies carried thereby in sealed compartments thereof, said container means having a wall formed with a discharge opening, manually operable means carried by said container means opposite said wall thereof for reciprocating movement by the operator from a rest position first in a forward direction away from said rest position and then in a rearward direction back to said rest position, and means connected at least in part to said manually operable means for responding to said forward movement thereof for feeding the strip of sheet material in a direction which will advance a body in a compartment of the sheet material out through said discharge opening and for cutting across the sheet material between the compartment thereof housing the latter body and the compartment thereof housing the next body so that the body which is fed through said discharge opening will be severed to drop from said container means, said manually operable means cooperating with at least the part of said feeding and cutting means which is connected thereto for retracting the latter part of said feeding and cutting means with said manually operable means when said manually operable means is returned to its rest position and for placing at least said part of said feeding and cutting means in readiness for feeding the next body to said discharge opening when the manually operable means is again moved forwardly from said rest position thereof, said manually operable means itself forming at least part of a wall of said container means.

2. The combination of claim 1 and wherein said means for feeding and cutting the sheet material includes at least a cutting blade connected to said manually operable means for movement therewith, said means for feeding and cutting also including at the region of said discharge opening a stop member cooperating with said blade for limiting the movement thereof forwardly with said manually operable means and for deflecting the blade through the sheet material between successive compartments thereof.

3. The combination of claim 2 and wherein said stop member is situated at an edge region of said discharge opening which is distant from said blade when said manually operable means is in its rest position.

4. The combination of claim 3 and wherein said wall of said container means carries at the edge region where said stop member is located a means for deflecting the strip of sheet material and a body carried thereby out through said discharge opening.

5. The combination of claim 3 and wherein said manually operable means carries forwardly of said blade a means for engaging the sheet material to prevent the latter from being deflected by pressure of the blade on the sheet material.

6. The combination of claim 1 and wherein said container means carries a signal means for giving an audible signal and a timing means operatively connected with said signal means for actuating the latter after a given time interval.

7. The combination of claim 6 and wherein said container means has at one end region a chamber for housing said signal means and timing means.

8. The combination of claim 7 and wherein said container means has a pair of opposed ends adjacent one of which said chamber for said signal and timing means is located, and said signal container means having a width and depth substantially smaller than its longitudinal dimension between said opposed ends, and the latter dimension between said opposed ends being sufficiently small to enable the container means to be conveniently carried in the pocket of a garment, in a handbag, or the like.

9. In a device for dispensing, one by one, a series of bodies arranged in a row within sealed compartments of an elongated sheet material which must be severed between said compartments for individually releasing bodies in their sealed compartments, container means for housing a strip of the sheet material and the bodies carried thereby in sealed compartments thereof, said container means having a wall formed with a discharge opening, manually operable means carried by said container means opposite said wall thereof for reciprocating movement by the operator from a rest position first in a forward direction away from said rest position and then in a rearward direction back to said rest position, and means connected at least in part to said manually operable means for responding to said forward movement thereof for feeding the strip of sheet material in a direction which will advance a body in a compartment of the sheet material out through said discharge opening and for cutting across the sheet material between the compartment thereof housing the latter body and the compartment thereof housing the next body so that the body which is fed through said discharge opening will be severed to drop from said container means, said manually operable means cooperating with at least the part of said feeding and cutting means which is connected thereto for retracting the latter part of said feeding and cutting means with said manually operable means when said manually operable means is returned to its rest position and for placing at least said part of said feeding and cutting means in readiness for feeding the next body to said discharge opening when the manually operable means is again moved forwardly from said rest position thereof, said manually operable means forming a wall of said container means opposite to said wall thereof which is formed with said discharge opening, and said container means having side walls carrying guide means for guiding said manually operable means, so that when the latter is displaced forwardly from said rest position thereof access may be had to the interior of said container means.

10. In a device for dispensing, one by one, a series of bodies arranged in a row within sealed compartments of an elongated sheet material which must be severed between said compartments for individually releasing the bodies in their sealed compartments, container means for housing a strip of the sheet material and the bodies carried thereby in sealed compartments thereof, said container means having a wall formed with a discharge opening, manually operable means carried by said container means opposite said wall thereof for reciprocating movement by the operator from a rest position first in a forward direction away from said rest position and then in a rearward direction back to said rest position, and means connected at least in part to said manually operable means for responding to said forward movement thereof for feeding the strip of sheet material in a direction which will advance a body in a compartment of the sheet material out through said discharge opening and for cutting across the sheet material between the compartment thereof housing the latter body and the compartment thereof housing the next body so that the body which is fed through said discharge opening will be severed to drop from said container means, said manually operable means cooperating with at least the part of said feeding and cutting means which is connected thereto for retracting the latter part of said feeding and cutting means with said manually operable means when said manually operable means is returned to its rest position and for placing at least said part of said folding and cutting means in readiness for feeding the next body to said discharge opening when the manually operable means is again moved forwardly from said rest position thereof, a stop means carried in part by said container means and in part by said manually operable means for stopping the forward movement of the latter when said manually operable means has reached a forward cutting position, said discharge opening having front and rear edges, and said stop means locating the part of the cutting means which is connected to said manually operable means at the region of said rear edge of said discharge opening when said manually operable means has reached said cutting position thereof, said rear edge of said discharge opening forming a part of said cutting means which is connected with said wall of said container means, and said manually operable means having a portion capable of being deflected by the operator toward said wall of said container means and carrying a blade of said cutting means which upon deflection of said portion of said manually operable means by the operator toward said wall of said container means cooperates with the rear edge region of said discharge opening for cutting through the sheet material.

11. The combination of claim 10 and wherein said wall of said container means is a bottom wall thereof while said manually operable means forms a top wall of said container means and is shiftable with respect to said bottom wall thereof, said stop means being formed by a front end wall of said container means and a stop member carried by said top wall and engaging said front end wall when said blade carried by said manually operable means becomes situated over the rear edge of said discharge opening.

12. The combination of claim 10 and wherein said feeding and cutting means includes a feeding member connected to said manually operable means for movement therewith and situated behind the part of the cutting means which is connected to said manually operable means for movement therewith.

13. The combination of claim 12 and wherein said wall of said container means carries in the interior of said container means a projecting portion for projecting up into the space between a pair of successive compartments to prevent retraction of the sheet material when said manually operable means is retracted back to said rest position thereof.

14. Thc combination of claim 10 and wherein said wall of said container means is formed in the interior of the latter with a longitudinal groove for accommodating the compartments, said wall having on opposite sides of said groove a pair of opposed side surfaces for engaging the lateral portions of the sheet material which extend beyond the compartments.

15. The combination of claim 10 and wherein said container means is in the form of a single unitary body while said manually operable means and the parts connected thereto are also in the form of a single unitary body, so that the entire dispensing device is composed only of two unitary bodies.

* * * * *